No. 762,605. PATENTED JUNE 14, 1904.
W. E. ANDREE.
MANGLE.
APPLICATION FILED JAN. 10, 1903.
NO MODEL. 3 SHEETS—SHEET 1.

WITNESSES: INVENTOR.
W. H. Cotton William E. Andree.
Arthur B. Seibold BY
ATTORNEY.

No. 762,605. PATENTED JUNE 14, 1904.
W. E. ANDREÉ.
MANGLE.
APPLICATION FILED JAN. 10, 1903.
NO MODEL. 3 SHEETS—SHEET 2.

WITNESSES:
W. H. Cotton

INVENTOR.
William E. Andreé.
BY
ATTORNEY.

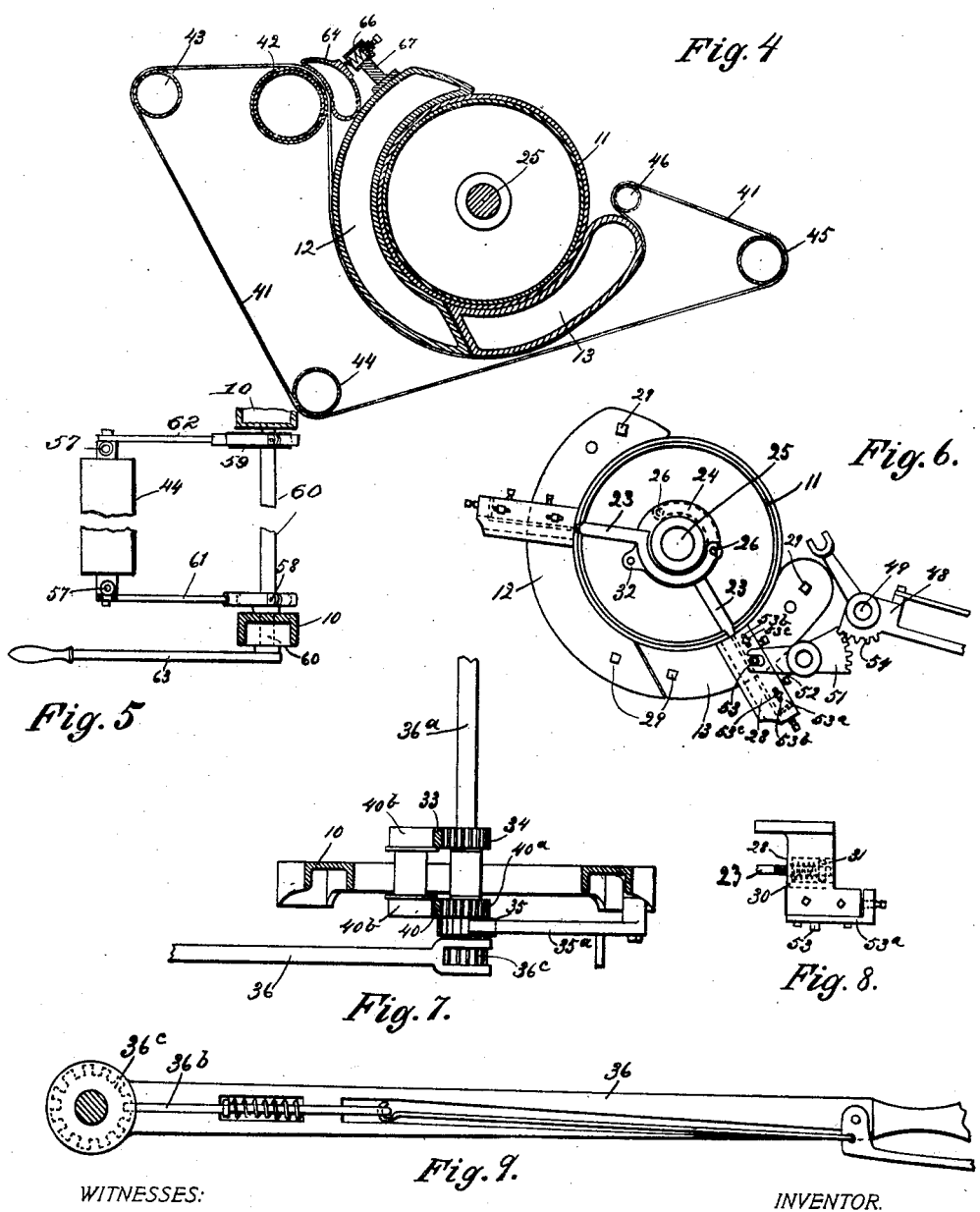

No. 762,605. Patented June 14, 1904.

UNITED STATES PATENT OFFICE.

WILLIAM E. ANDREÉ, OF CHICAGO, ILLINOIS, ASSIGNOR TO NELSON & KREUTER COMPANY, OF CHICAGO, ILLINOIS, A CORPORATION OF ILLINOIS.

MANGLE.

SPECIFICATION forming part of Letters Patent No. 762,605, dated June 14, 1904.

Application filed January 10, 1903. Serial No. 138,557. (No model.)

*To all whom it may concern:*

Be it known that I, WILLIAM E. ANDREÉ, a citizen of the United States, and a resident of Chicago, county of Cook, and State of Illinois, have invented certain new and useful Improvements in Mangles, of which the following is a specification and which are illustrated in the accompanying drawings, forming a part thereof.

This invention relates to that type of ironing-machines or mangles in which the goods to be ironed are passed between a rotating cylinder and a heated bed, usually in the form of a plurality of steam-chests arranged concentrically with the cylinder.

The object of the invention is to provide, in a machine of this class having its steam-chests movable radially relatively to the cylinder and having an apron impinging against the outer faces of the chests, means for controlling the chests and apron-carrying rollers so that they may be moved simultaneously. Its further objects are to generally improve the machine in various particulars, as hereinafter fully pointed out; and the invention consists in the parts and arrangement of parts, as hereinafter described, and as illustrated in the accompanying drawings, in which—

Figure 1:
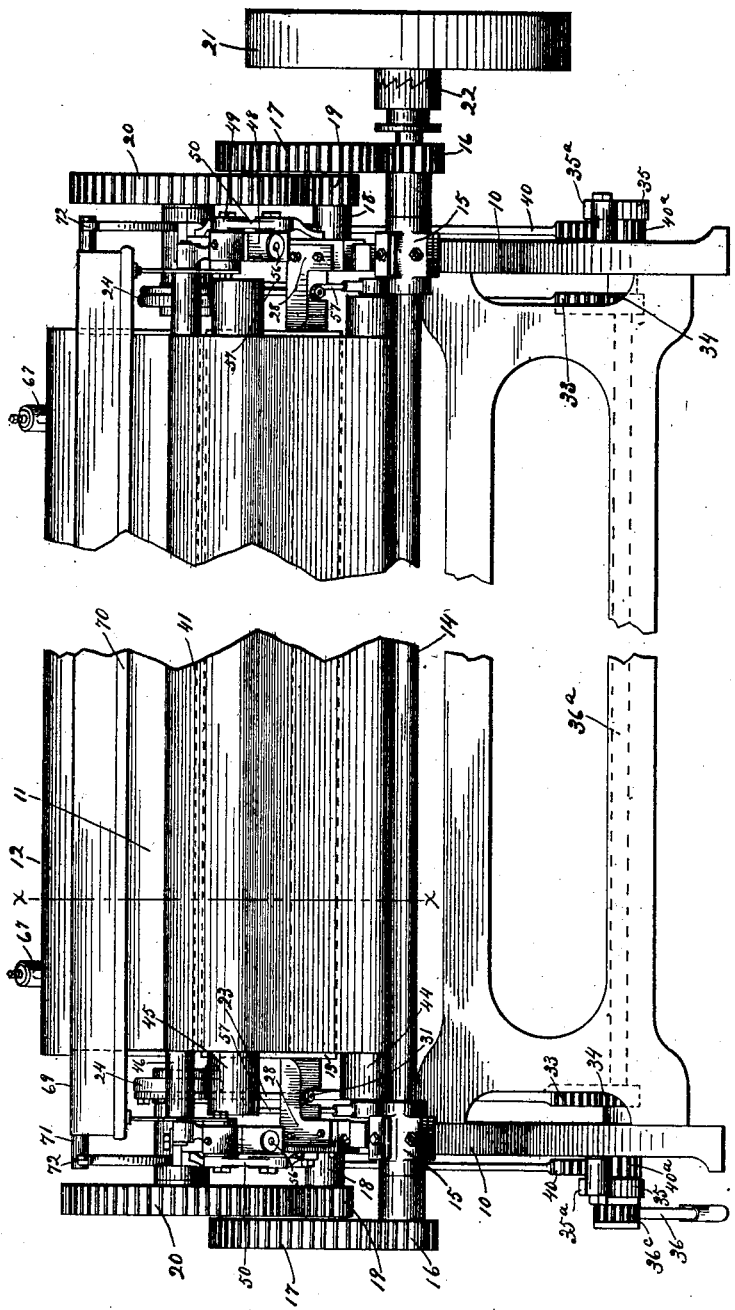
Figures 2, 3, 10:
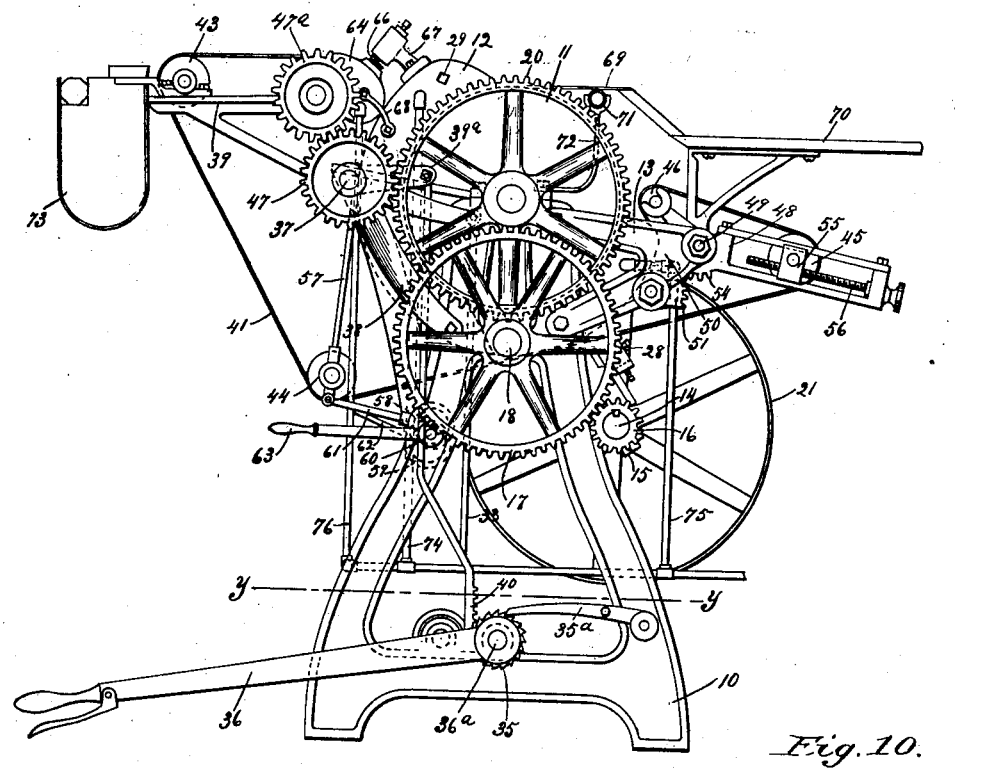

Figure 1 is a rear elevation of a mangle constructed in accordance with my invention. Fig. 2 is an end elevation of the same. Fig. 3 relates to a detail of the hinged brackets carrying the front belt-rollers. Fig. 4 is a transverse section on the line $x\ x$ of Fig. 1. Fig. 5 is a plan of a detail of the belt-truing mechanism shown in elevation in Fig. 2. Fig. 6 is a view in elevation of the means for throwing the heated beds or chests into and out of action, the frame of the machine and the belt not being shown; and Fig. 7 is a section on the line $y\ y$ of Fig. 2. Fig. 8 is a detail of one of the chest-carrying parts. Fig. 9 is a detail of the chest-controlling lever, and Fig. 10 is a detail showing the support and controlling mechanism for the apron-truing roller.

The main frame 10 of the machine and also the padded cylinder 11, heated in the ordinary manner, and the concentric chests 12 and 13, which form the bed and which are heated by steam or other means, may be and are shown as of common construction.

The main driving-shaft 14, which is shown as journaled in the ends of the frame 10, as at 15, has fixed to each end a pinion 16, which meshes with and drives a gear 17, running on a stub-shaft 18, set in the end of the frame 10. A pinion 19, fixed to the gear 17, drives a gear 20, fixed to the cylinder-shaft. The shaft 14 carries at one end a drive-pulley 21, which is coupled to the shaft 14 by a clutch 22 in the usual manner.

The steam-chests 12 and 13 are carried, as shown in Letters Patent No. 702,687, issued to me June 17, 1902, from a pair of rings 24, loosely mounted on the cylinder-shaft 25, one at each end thereof, the chests being connected therewith by links 23, pivoted to the rings at 26. In order to provide the greatest possible range of movement of the chests, the links 23 are curved so as to conform to the curvature of the ring 24, so that when the chests are drawn up to the cylinder the inner ends of the links are diametrically opposite their respective chests. This arrangement also releases the controlling mechanism from the weight of the chests and transfers it to the shaft 25.

The connection between each of the links 23 and the chests 12 13 is a spring 30, encircling the link and reacting between a nut 31 at the end thereof and the wall of a box 28, secured to the chest by bolts 29, and sliding on a suitable bracket formed on the frame 10 and forming a way radial as to the shaft 25 for the chest.

The chests are controlled by a hand-lever 36, mounted loosely on a shaft $36^a$, journaled in the ends of the frame 10, the lever being clutched to the shaft by means of a pawl $36^b$, engaging a toothed wheel $36^c$, fixed on the shaft. Each of a pair of gears 34, fixed on the shaft $36^a$, coöperates with a rack-bar 33, pivoted to the lug 32 of each of the rings 24, and a retaining-ratchet 35 on the shaft $36^a$ and pawl $35^a$, pivoted to the frame, prevent the recession of the chests.

As thus far described the mangle is substantially the same as shown in my earlier patent. The chests 12 13 are, however, machined on their outer faces to provide polishing-surfaces over which the articles ironed may be carried by an endless apron 41, running over suitable rollers, as 42, 43, 44, 45, and 46, motion being communicated to the apron by means of the gear 47, meshing with the gear 20, and driving the gear $47^a$, mounted upon the shaft of the roller 42. The gears for driving the apron and the roller 42, which transmits motion to it, are so proportioned with relation to the gear 20 that the speed of the apron is the same as the surface speed of the cylinder.

The carrying-rollers 42 and 43 are journaled on a frame 39, pivoted upon a stud-shaft 37, fixed in each of the bracket-arms 38 rising from the ends of the frame 10, and upon which stud-shaft the gear 47 is loosely mounted, the trunnions of the roller 42 turning in boxes (not shown) resting in seats 65, formed at the inner ends of the said frame. This frame 39 is oscillated by means of rack-bars 40, secured to arms $39^a$, projecting from the frame and engaging gears $40^a$, fixed on the shaft $36^a$, so that the frame is rocked as the chests 12 13 are shifted, thereby slackening the apron to allow the chests to recede and tightening it as they are advanced. The rack-bars 33 and 40 are held in engagement with their respective pinions by rollers $40^b$, located back of the said rackbars. A corresponding movement of the carrying-rollers 45 46 is secured by journaling them in a frame 48, pivoted at 49 to suitable brackets 50, projecting from the frame 10. This frame is rocked by means of a segmental gear 51, pivoted to the bracket 50, and having an arm 52 slotted and engaging a pin 53 set in the box 28, this segmental gear 51 meshing with a segmental gear 54, formed on the frame 48 concentric with its pivot.

The pin 53 instead of projecting from the box 28 itself, preferably extends from a plate $53^a$, which is provided with longitudinal slots $53^b$, through which pass the bolts $53^c$ for securing the plate to the block 28, thereby providing for an adjustment of the pin with relation to the block and a consequent variation in the movement of the segment 51.

The roller 45 serves to tighten the belt and is journaled in blocks 55, sliding in slotted arms of the frame 48 and controlled by screws 56, passing through the blocks and the ends of the arms carrying them.

The roller 44 serves to laterally adjust the apron, and to this end it is journaled in arms 57, swinging from the brackets 38, and these arms are oscillated by eccentrics 58 59, fixed on a shaft 60 and connected by rods 61 62 with the arms 57, the eccentrics being relatively so disposed that they swing the arms in opposite directions. The shaft 60, which is journaled in the frame 10, is provided with a hand-lever 63, by means of which it may be turned. The roller 44 is thus thrown out of parallel with the other apron-carrying shafts, as may be necessary to shift the apron laterally.

The rollers 42 43 are substantially in horizontal alinement when in operative position, so that the stretch of apron between them serves as a receiving-table for the goods, which are first carried under an additional hot-chest 64, supported by links 68, pivotally connected thereto and to the ends of the chest 12. The face of this chest 64 is concentric with the roller 42 and pressed thereagainst by springs, one of which is shown in Figs. 2 and 4 and designated 66, reacting against brackets 67, rising from the chest 12, the tension of such springs being adjusted by means of set-screws mounted in the brackets.

The chest 64 not only assists in drying the goods, but it serves the further purpose of guiding them downward against the outer face of the chest 12, across which and the face of the chest 13 they are carried by the apron. The roller 46 is located above the upper edge of the chest 13 and serves to deflect the goods inwardly toward the cylinder 11, which guides them downward and across the inner faces of the chests 13 12. Emerging from beneath the chest 12 the goods are stripped from the cylinder by the stripping-blade 69, secured to the receiving-table 70, mounted upon brackets rising from the brackets 50, the stripping-blade being, preferably, additionally supported by a bar 71, carried by arms 72, rising from the frame 10.

A basket 73 may be carried by the frame 39, from which the goods may be fed to the machine.

Steam may be led to the chests 12, 13, and 64 by any suitable means, as the pipes 74 75 76, adapted to swing with the chests.

I claim as my invention—

1. In a mangle, in combination, a rotatable cylinder, a chest concentric therewith, means for moving the chest to and from the face of the cylinder, an endless apron supported independently of the chest and impinging against its outer face, rollers for carrying the apron, means for tightening the apron, and operating mechanism for simultaneously moving the chest and the apron-tightening means.

2. In a mangle, in combination, a rotatable cylinder, a chest concentric therewith, an endless traveling apron impinging against the outer face of the chest, a swinging frame, an apron-carrying roller mounted on the frame, and means for simultaneously moving the chest to and from the cylinder and swinging the frame.

3. In a mangle, in combination, a rotatable cylinder, a pair of chests concentric with and movable to and from the cylinder, a pair of swinging frames mounted one at each side of the cylinder, rollers carried by the frames, an endless apron running on the rollers and impinging against the outer faces of the chests and means for simultaneously moving the chests and swinging the roller-carrying frames.

4. In a mangle, in combination, a rotatable cylinder, a chest concentric therewith, means for moving the chest to and from the face of the cylinder, an endless apron impinging against the outer face of the chest, a swinging frame, an apron-carrying roller mounted on the frame, and a guide-chest concentric with the roller and bearing upon the apron passing over the latter.

5. In a mangle, in combination, a rotatable cylinder, a chest concentric therewith, means for moving the chest to and from the face of the cylinder, an endless apron impinging against the outer face of the chest, a swinging frame, an apron-carrying roller mounted on the frame, a guide-chest concentric with the roller, and means for yieldingly pressing the guide-chest against the apron passing over the roller.

6. In a mangle, in combination, a rotatable cylinder, a chest concentric therewith, a traveling apron impinging against the outer face of the chest, a swinging frame, an apron-carrying roller mounted on the frame at its free end, an arm extending inwardly from the frame, a bar jointed to the arm and provided with a rack portion, a pinion meshing with the rack, and a ratchet mechanism for operating the pinion.

7. In a mangle, in combination, a rotatable cylinder, a chest concentric therewith, a traveling apron impinging against the outer face of the chest, rollers around which the apron passes and one of which is carried on a swinging frame, means for moving the chest away from the cylinder, and connection between the swinging frame and the chest.

8. In a mangle, in combination, a rotatable cylinder, a chest concentric therewith, a traveling apron impinging against the outer face of the chest, rollers around which the apron passes and one of which is carried on a swinging frame, means for moving the chest away from the cylinder, a pin extending from the chest, a segmental gear having a slotted arm engaging the pin, and a segmental gear fixed to the swinging frame and meshing with the first-mentioned gear.

9. In a mangle, in combination, a rotatable cylinder, a pair of chests concentric with the cylinder, a traveling apron impinging against the outer faces of the chests, a pair of separated movable swinging frames, rollers mounted on the frames, means for moving the chests away from the cylinder, and connection between such moving means and one of the frames for moving the same simultaneously with the chests.

WILLIAM E. ANDREÉ.

Witnesses:
  LOUIS K. GILLSON,
  ADAM KREUTER.